(12) United States Patent
Navarre et al.

(10) Patent No.: US 11,997,329 B2
(45) Date of Patent: May 28, 2024

(54) GENERATING MEDIA PROGRAMS CONFIGURED FOR SEAMLESS PLAYBACK

(71) Applicant: DISNEY ENTERPRISES, INC., Burbank, CA (US)

(72) Inventors: Katharine S. Navarre, Santa Monica, CA (US); Jason Lewis, Cupertino, CA (US); Dionysius Mavromatis, Kirkland, WA (US); Adam Eivy, Seattle, WA (US); Sujal Shah, West Hartford, CT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/683,176

(22) Filed: Nov. 13, 2019

(65) Prior Publication Data

US 2021/0144416 A1    May 13, 2021

(51) Int. Cl.
*H04N 21/2387*    (2011.01)
*H04N 21/2343*    (2011.01)
*H04N 21/258*     (2011.01)

(52) U.S. Cl.
CPC ..... *H04N 21/2387* (2013.01); *H04N 21/2343* (2013.01); *H04N 21/25891* (2013.01)

(58) Field of Classification Search
CPC ........... H04N 21/2387; H04N 21/2343; H04N 21/25891

(Continued)

(56) References Cited

U.S. PATENT DOCUMENTS 8,223,152 B2   7/2012  Kim
8,806,531 B1   8/2014  Ho et al.
(Continued)

FOREIGN PATENT DOCUMENTS

WO    97/08898 A1    3/1997
WO    00/62552 A2    10/2000

OTHER PUBLICATIONS

Non-Final Office Action received for U.S. Appl. No. 16/155,799, dated Jan. 25, 2021, 19 pages.
(Continued)

*Primary Examiner* — An Son P Huynh
(74) *Attorney, Agent, or Firm* — Squire Patton Boggs LLP; Sarah Mirza (57) ABSTRACT

A media processing engine selectively transcodes only a portion of the media clips to be included in a personalized media program and generates playback data that allows seamless playback of the personalized media program. The media processing engine analyzes initial playback data associated with the media program that indicates the media clips needed to generate the personalized media program. The media processing engine identifies one or more transitions between media clips in the personalized media program and determines specific segments of those media clips that are associated with the identified transition(s). The media processing engine performs transcoding operations with the determined segments of the media clips to generate one or more transition clips. The media processing engine then updates the initial playback data to indicate that the transition clip(s) should be played during the corresponding transition(s) between the associated media clips.

19 Claims, 4 Drawing Sheets

(58) Field of Classification Search
USPC ........................................................ 725/116
See application file for complete search history.

(56) References Cited

U.S. PATENT DOCUMENTS

| | | | |
|---|---|---|---|
| 8,937,685 B1 | 1/2015 | Ho et al. | |
| 9,386,351 B1 | 7/2016 | Ho et al. | |
| 9,781,458 B2 | 10/2017 | Ho | |
| 10,051,342 B1 | 8/2018 | Ho | |
| 10,091,438 B1 | 10/2018 | Ho et al. | |
| 10,194,186 B1 | 1/2019 | Ho | |
| 10,701,415 B2* | 6/2020 | Lee | H04N 21/2187 |
| 10,741,213 B1* | 8/2020 | Selby | G11B 27/031 |
| 11,601,721 B2* | 3/2023 | Bloch | H04N 21/8541 |
| 2002/0144262 A1* | 10/2002 | Plotnick | H04N 21/458 |
| | | | 348/E7.071 |
| 2003/0206596 A1* | 11/2003 | Carver | H04N 21/44016 |
| | | | 375/240.26 |
| 2005/0281328 A1* | 12/2005 | Hurst, Jr. | H04N 21/23424 |
| | | | 375/240 |
| 2009/0106447 A1* | 4/2009 | Lection | H04L 67/02 |
| | | | 709/236 |
| 2011/0200116 A1* | 8/2011 | Bloch | G11B 27/10 |
| | | | 375/E7.027 |
| 2011/0202562 A1* | 8/2011 | Bloch | G06F 16/745 |
| | | | 707/E17.014 |
| 2011/0246621 A1* | 10/2011 | May, Jr. | H04L 65/612 |
| | | | 709/219 |
| 2012/0237183 A1* | 9/2012 | Chen | H04N 7/17318 |
| | | | 386/E9.011 |
| 2013/0259442 A1* | 10/2013 | Bloch | H04N 21/47202 |
| | | | 386/E5.028 |
| 2013/0297054 A1* | 11/2013 | Ojanpera | H04N 21/233 |
| | | | 700/94 |
| 2014/0082666 A1* | 3/2014 | Bloch | G06F 3/04842 |
| | | | 725/37 |
| 2015/0067723 A1* | 3/2015 | Bloch | H04N 21/4325 |
| | | | 725/32 |
| 2016/0105724 A1* | 4/2016 | Bloch | H04N 21/2365 |
| | | | 725/38 |
| 2017/0092331 A1* | 3/2017 | Eppolito | H04N 21/854 |
| 2017/0316708 A1 | 11/2017 | Harb et al. | |
| 2017/0339437 A1 | 11/2017 | Lee et al. | |
| 2018/0004746 A1 | 1/2018 | Hedinsson et al. | |
| 2018/0096385 A1 | 4/2018 | Somaya et al. | |
| 2018/0356967 A1 | 12/2018 | Rasheed | |
| 2019/0020912 A1 | 1/2019 | Solaro et al. | |
| 2019/0076741 A1* | 3/2019 | Thompson | H04N 21/25891 |
| 2019/0369837 A1* | 12/2019 | Davis | G09B 5/06 |
| 2019/0373330 A1* | 12/2019 | Bloch | H04N 21/4532 |
| 2020/0137464 A1* | 4/2020 | Lewis | G06F 16/433 |
| 2020/0204861 A1 | 6/2020 | Loheide et al. | |
| 2021/0084350 A1 | 3/2021 | Chandra | |

OTHER PUBLICATIONS

Final Office Action received for U.S. Appl. No. 16/683,178, dated Jan. 11, 2021, 10 pages.

Non-Final Office Action received for U.S. Appl. No. 16/683,178, dated Apr. 27, 2021, 14 pages.

Extended European Search Report for application No. 20204912.8 dated Jan. 29, 2021.

* cited by examiner

GENERATING MEDIA PROGRAMS CONFIGURED FOR SEAMLESS PLAYBACK

BACKGROUND

Field of the Various Embodiments

The various embodiments relate generally to computer science and media production and, more specifically, to generating media programs that are configured for seamless playback.

DESCRIPTION OF THE RELATED ART

A media streaming service is structured to provide a variety of different types of media programs to users. As part of their overall media program offerings, some media streaming services provide personalized media programs to users that are dynamically generated to reflect user preferences. For example, a given media streaming service could provide a particular user with access to a personalized sports program that features a sequence of media clips associated with a sports team in which the user has previously expressed interest.

To prepare a personalized media program for playback on a given client device, a media streaming service usually downloads all of the source media clips that are going to be included in the personalized media program to a transcoding server. The transcoding server transcodes all of the source media clips together to generate a seamless, full-length, transcoded version of the personalized media program. The transcoded version of the personalized media program is then transmitted to a content delivery network that can stream the personalized media program to a given client device.

One drawback of the above approach is that downloading and transcoding all of the source media clips needed to generate the personalized media program and subsequently transmitting the transcoded version of the personalized media program to the content delivery network typically consumes large amounts of bandwidth and processing power. Consequently, personalized media programs cannot be generated "on demand" for hundreds or thousands of individual users. As a result, even though personalized media programs can be generated that target the individual interests of specific users, these types of media programs cannot be generated and distributed in a satisfactory manner to the user base of a media streaming service.

As the foregoing illustrates, what is needed in the art are more effective techniques for generating media programs and streaming those media programs to users.

SUMMARY

Various embodiments include a computer-implemented method for generating a media program for playback, including determining a first transition between a first media clip and a second media clip based on initial playback data that indicates that a first media program should include one or more portions of the first media clip and one or more portions of the second media clip, processing at least a first portion of the first media clip and a first portion of the second media clip to generate a first transition clip, and causing a media player to playback the first media program, wherein the first media program includes a second portion of the first media clip, the first transition clip, and a second portion of the second media clip, and wherein, during playback of the first media program, the first transition clip is played back immediately subsequent to when playback of the second portion of the first media clip completes, and the second portion of the second media clip is played back immediately subsequent to when playback of the first transition clip completes.

At least one advantage of the disclosed techniques relative to the prior art is that the disclosed techniques enable personalized media programs to be dynamically generated without consuming large amounts of bandwidth or processing power. Accordingly, the disclosed techniques can be scaled to generate personalized media programs for numerous users simultaneously.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As noted above, downloading and transcoding all of the source media clips needed to generate a personalized media program and transmitting the transcoded version of the personalized media program to a content delivery network typically consumes large amounts of bandwidth and processing power. Consequently, personalized media programs cannot be generated "on demand" for hundreds or thousands of individual users. As a result, even though personalized media programs can be generated that target the individual interests of specific users, these types of media programs cannot be generated and distributed in a satisfactory manner to the user base of a media streaming service.

To address these issues, various embodiments include a media processing engine that selectively transcodes only a portion of the media clips to be included in a personalized media program and then generates playback data that allows seamless playback of the personalized media program. The media processing engine analyzes initial playback data associated with the media program. The initial playback data indicates the media clips needed to generate the personalized media program. The media processing engine identifies one or more transitions between media clips in the personalized media program and determines specific segments of those media clips that are associated with the identified transition(s). The media processing engine performs transcoding operations with the determined segments of the media clips to generate one or more transition clips. The media processing engine then updates the initial playback data to indicate that the transition clip(s) should be played during the corresponding transition(s) between media clips and that shortened versions of the media clips should be played to accommodate the added transition segments. In this manner, the media processing engine can provide a seamless viewing experience of the personalized media program with limited expenditure of bandwidth and processing power.

At least one advantage of the disclosed techniques relative to the prior art is that the disclosed techniques enable personalized media programs to be dynamically generated without consuming large amounts of bandwidth or processing power. Accordingly, the disclosed techniques can be scaled to generate personalized media programs for numerous users simultaneously. Another advantage of the disclosed techniques is that the personalized media programs can be generated quickly, thereby providing users with faster access to personalized media programs. Yet another advantage is that additional transitional content can be dynamically inserted into media programs, thereby facilitating smooth transitions between media clips. These technological advantages represent one or more technological advancements over prior art approaches.

System Overview

Figure 1:
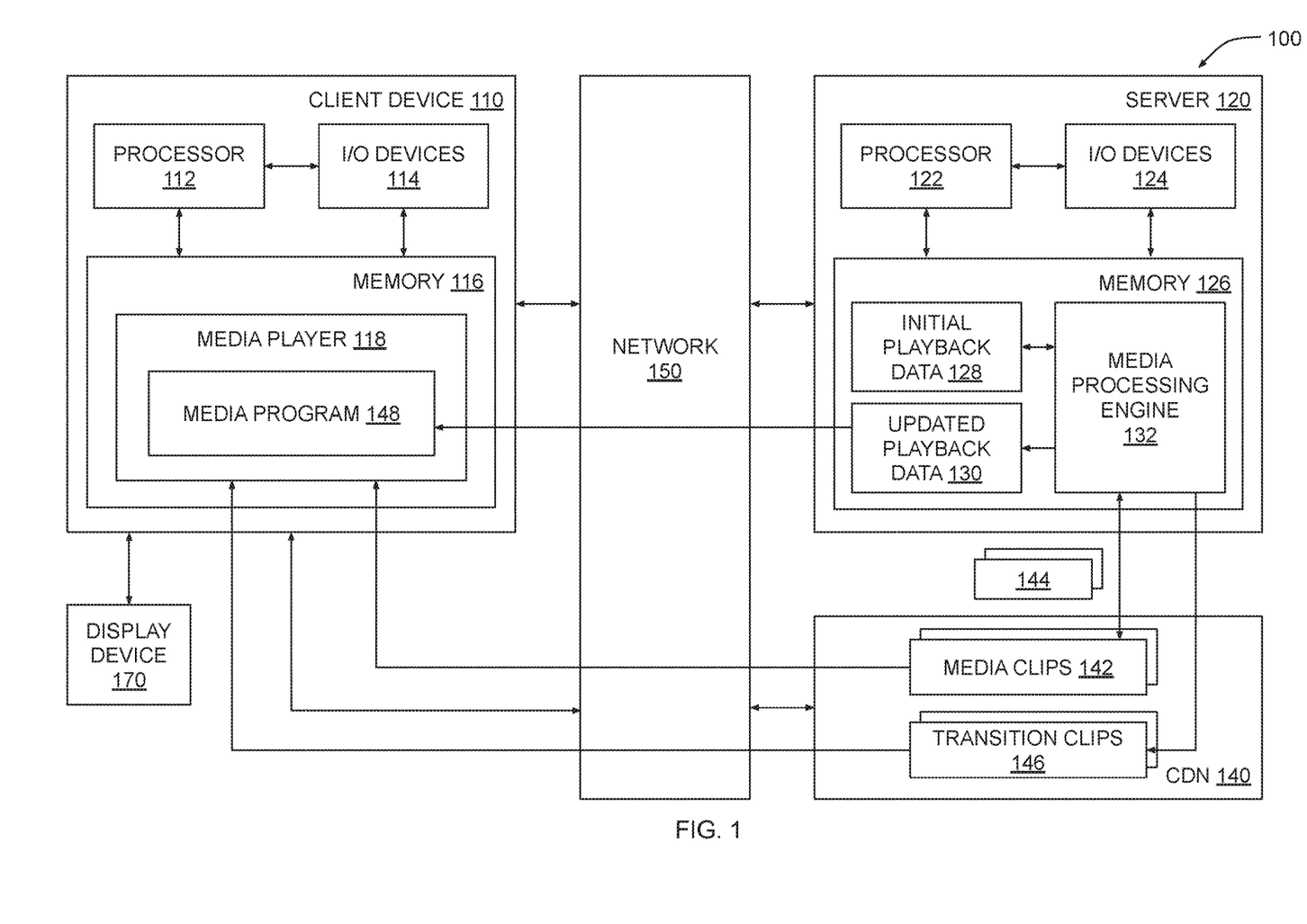
FIG. 1 illustrates a system configured to implement one or more aspects of the various embodiments.

FIG. 1 illustrates a system configured to implement one or more aspects of the various embodiments. As shown, a system 100 includes a client device 110, server 120, and content delivery network (CDN) 140 coupled together via a network 150. Client device 110 is also coupled to a display device 170. In one embodiment, client device 110 and display device 170 may be integrated with one another. Client device 110, server 120, and CDN 140 may be any technically feasible type of computer system, including a desktop computer, a laptop computer, a mobile device, a virtualized instance of a computing device, a distributed and/or cloud-based computer system, a smart display (e.g., a smart television, smart glasses, etc.), and so forth. As a general matter, the disclosed techniques can be implemented in conjunction with any technically feasible type of computing device and/or display technology. Network 150 may be any technically feasible set of interconnected communication links, including a local area network (LAN), wide area network (WAN), the World Wide Web, or the Internet, among others.

Client device 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a keyboard, a mouse, a speaker, or a touchscreen, among others. In one embodiment, I/O devices 114 may include display device 170. For example, client device 110 could be a smart display configured to perform both processing operations and display operations. Memory 116 includes any technically feasible storage media configured to store data and software applications, such as, for example, a hard disk, a random-access memory (RAM) module, and a read-only memory (ROM). Memory 116 includes a media player 118. Media player 118 is a software application configured to play media programs. Media player 118 includes a media program 148 that can be displayed via display device 170.

Server 120 includes a processor 122, I/O devices 124, and a memory 126, coupled together. Processor 122 includes any technically feasible set of hardware units configured to process data and execute software applications, such as one or more CPUs. I/O devices 124 include any technically feasible set of devices configured to perform input and/or output operations, such as a display device, a keyboard, a mouse, or a touchscreen, among others. Memory 126 includes any technically feasible storage media configured to store data and software applications, such as, for example, a hard disk, a RAM module, and a ROM. Memory 126 includes a media processing engine 132, initial playback data 128, and updated playback data 130.

In operation, media processing engine 132 obtains media clips 142 and stores media clips 142 in CDN 140. Media clips 142 represent source media content that can be used for generating media program 148. In one embodiment, media processing engine 132 may obtain user data that characterizes the user of client device 110 and then identifies media clips 142 using a recommendation service that recommends relevant media content for different users. Media processing engine 132 generates or obtains initial playback data 128 that indicates specific media clips 142 that should be used to generate media program 148. Initial playback data 128 also indicates locations from which those media clips can be streamed and any other data needed for streaming purposes.

Media processing engine 132 is configured to analyze initial playback data 128 in order to identify transitions between media clips 142 to be included in media program 148. Without additional processing, these transitions can cause discontinuities during playback of media program 148, and therefore, additional processing is needed to provide a seamless viewing experience of media program 148. In the context of this disclosure, the term "seamless" refers to a mode of playback where transitions between different portions of a media program occur with minimal or without audio and/or visual playback gaps.

To facilitate seamless playback, media processing engine 132 accesses media clips 142 and obtains segments 144 of those media clips that reside near the identified transitions. A given segment 144 can be a portion of a media clip 142 that resides towards the end of that media clip 142, just before a transition to a subsequent media clip 142, or a portion of a media clip 142 that resides towards the beginning of that media clip 142, just after a transition from a previous media clip 142. In one embodiment, a given segment 144 may be a transport stream (.TS) file.

Media processing engine 132 processes segments 144 to generate transition clips 146 for storage in CDN 140. Each transition clip 146 represents a seamless transition between a given media clip 142 and a subsequent media clip 142 set forth in initial playback data 128. In one embodiment, media processing engine 132 may incorporate additional media content into a given transition clip 146, including visual effects, among other types of content.

Media processing engine 132 also generates updated playback data 130 based on initial playback data 128 in order to reference not only media clips 142, but transition clips 146, as well. Updated playback data 130 also indicates that shortened versions of media clips 142 should be played during playback of media program 148 and that transition clips 146 should be played between these shortened versions of media clips 142. Media processing engine 132 is described in greater detail below in conjunction with FIG. 2. An example of how media processing engine 132 performs the above operations is set forth in conjunction with FIG. 3.

Software Overview

Figure 2:
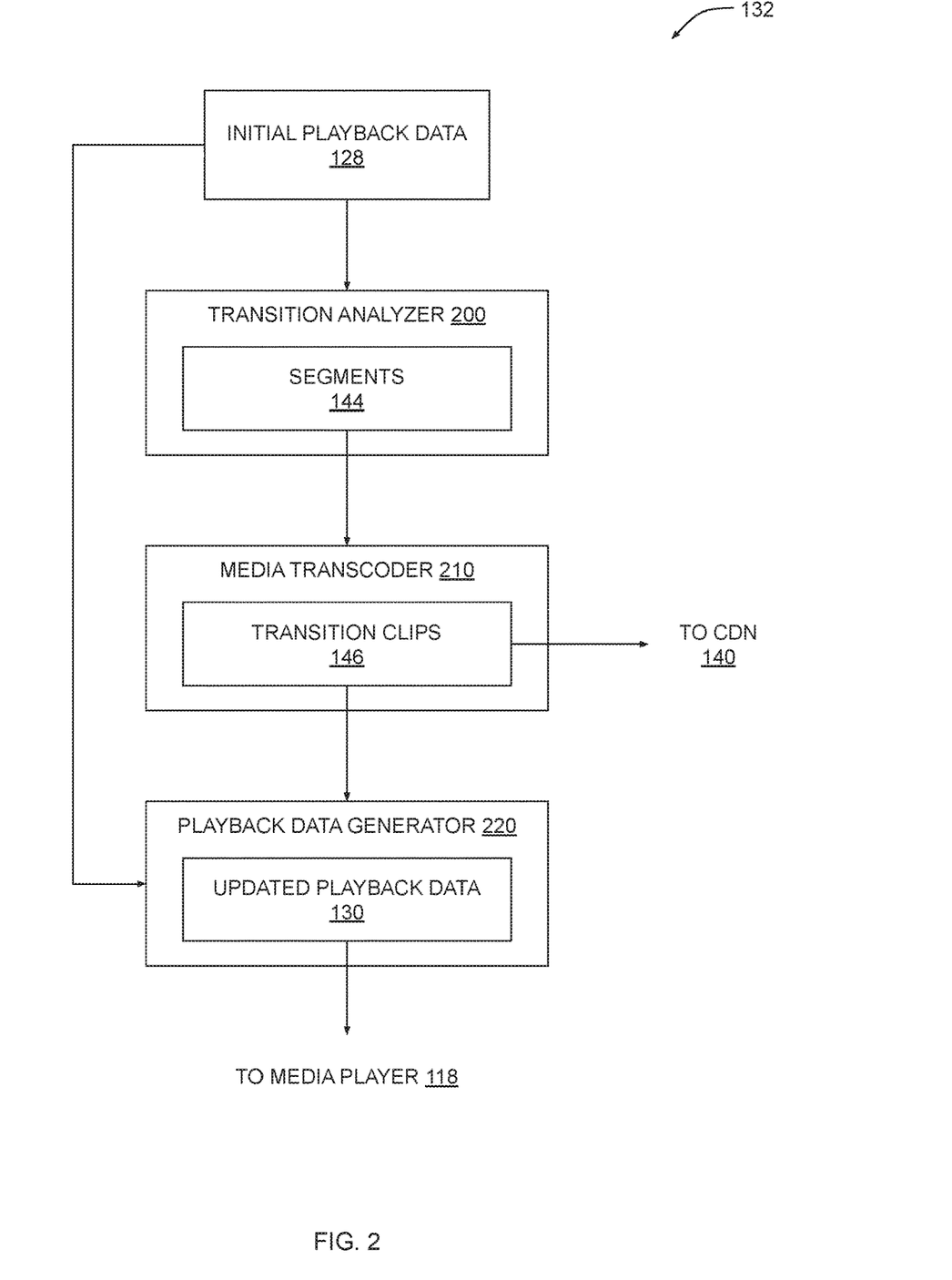
FIG. 2 is a more detailed illustration of the media processing engine of FIG. 1, according to various embodiments.

FIG. 2 is a more detailed illustration of the media processing engine 132 of FIG. 1, according to various embodiments. As shown, media processing engine 132 includes a transition analyzer 200, a media transcoder 210, and a playback data generator 220.

Transition analyzer 200 is configured to analyze initial playback data 128 in order to determine transitions between media clips 142. Initial playback data 128 generally defines the order in which media clips 142 should be played during playback of media program 148, and specifically indicates the start time, duration, and/or end time for each media clip 142. Transition analyzer 200 determines the occurrence of a given transition between any two media clips 142 when initial playback data 128 indicates that one of those two media clips immediately precedes or immediately follows the other media clip 142. Transition analyzer 200 obtains segments 144 that include portions of media clips 142 associated with the determined transitions and transmits segments 144 to media transcoder 210.

Media transcoder 210 performs a transcoding operation with segments 144 to generate transition clips 146. For a given transition, media transcoder 210 transcodes any segments 144 associated with the given transition to generate one transition clip 146. For example, suppose media transcoder 210 receives one segment 144 derived from the end of a first media clip 142 and another segment 144 derived from the beginning of a second media clip 142. Media transcoder 210 could transcode the two segments 144 to generate one transition clip 146. The transition clip 146 in this example would be played between the first media clip 142 and the second media clip 142, instead of the two segments 144 used to generate that transition clip 146, thereby enabling a seamless transition between the two media clips with a reduced amount of transcoding. Media transcoder 210 can, in some instances, composite visual and/or audio effects with a given transition clip 146 or add additional media content, among other options. For example, media transcoder 210 could combine the segments 144 associated with a given transition with transition-oriented visual graphics. In one embodiment, the transition-oriented visual graphics may be determined based on user data associated with the user.

Playback data generator 220 processes initial playback data 128 and transition clips 146 in order to generate updated playback data 130. Updated playback data 130 can be processed by media player 118 in order to stream media clips 142 and transition clips 146 during playback of media program 148. Playback data generator 220 modifies the start times, durations, and/or end times of media clips 142 in order to accommodate transition clips 146. Returning to the above example, playback data generator 220 could generate updated playback data 130 to indicate that playback of the first media clip 142 should stop slightly earlier (e.g., one second earlier), thereby playing during a first playback interval, and playback of the second media clip 142 should start slightly later (e.g., one second later), thereby playing during a second interval. Transition clip 146 can then be played during an intervening interval that occurs between the first interval and the second interval. In this example, the ending portion of the first media clip 142 and the beginning portion of the second media clip 142 would not be played and transition clip 146 would be played during the intervening interval instead.

In the manner described above, media processing engine 132 performs various processing operations, including transcoding operations, with only portions of media clips 142 associated with transitions between those media clips. In this manner, media processing engine 132 significantly reduces the amount of media content that needs to be transmitted and processed. Because less media content needs to be transmitted and processed, media processing engine 132 can prepare media programs for playback and/or streaming much faster than possible with conventional techniques. Therefore, media processing engine 132 can provide "on demand" access to dynamically generated media programs, including personalized media programs generated for individual users. An example of how media processing engine 132 performs the above techniques is described below in conjunction with FIG. 3.

Exemplary Transition Clip Generation

Figure 3:
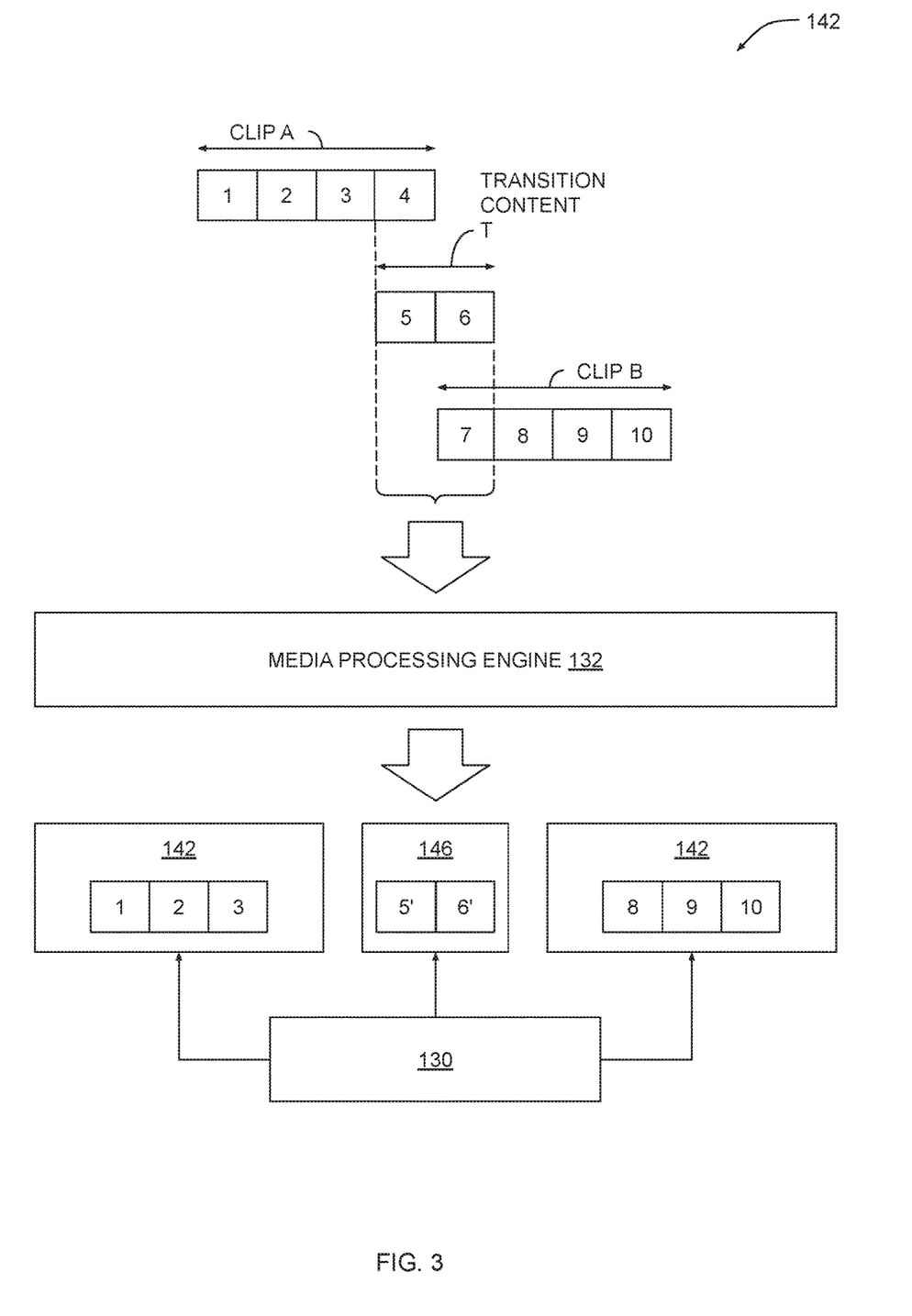
FIG. 3 illustrates how the media processing engine of FIG. 1 generates a transition clip, according to various embodiments.

FIG. 3 illustrates how the media processing engine 132 of FIG. 1 generates a transition clip, according to various embodiments. As shown, media clips 142 include clip A and clip B. Clip A includes segments 1, 2, 3, and 4, while clip B includes segments 7, 8, 9, and 10. Initial playback data 128 indicates that during streaming of media program 148, clip A should be played back followed by clip B. To facilitate a seamless transition between clip A and clip B, media processing engine 132 obtains segment 4 of clip A and segment 7 of clip B and performs one or more media processing operations with those segments to generate a transition clip 146.

In the example shown, media processing engine 132 combines segments 4 and 7 with transition content T to generate transition clip 146. Transition content T includes segments 5 and 6. Segments 5 and 6 could represent, for example, visual effects to be composited with segments 4 and 7, respectively. Media processing engine 132 combines segments 4 and 7 with segments 5 and 6, respectively, to generate segments 5' and 6' within transition clip 146, respectively. Upon generation of transition clip 146, media processing engine 132 generates updated playback data 130 to indicate that segments 1, 2, and 3 of clip A should be played, followed by segments 5' and 6' of transition clip 146, followed by segments 8, 9, and 10 of clip B. In this manner, media processing engine 132 enables the seamless playback of clips A and B without needing to download and process all segments of clips A and B. In various embodiments, media processing engine 132 can generate transition clip 146 by performing one or more editing, blending, or compositing operations with segments 4 and 7 of clips A and B, respectively, without introducing additional transition content.

In one embodiment, the techniques described above may be applied to generate different versions of a given media program. For example, suppose transition content T varies between different users. Media processing engine 132 could generate different versions of media program 148 having different transitions between clip A and clip B. In another example, media processing engine 132 could generate media program 148 for a first user and then replace specific segments of media program 148 with other media content (e.g., using another clip instead of clip B) to generate a different media program for a different user. Transition content that can vary between users includes advertisements, text, graphics, logos, branding assets, and user interface elements, among other types of content. Transition content can also vary between users in length, color scheme, style, and any other technically feasible attribute.

As a general matter, media processing engine 132 is configured to perform media processing operations that affect just a portion of the source media content associated with a given media program. Accordingly, media processing engine 132 can apply the disclosed techniques to conserve bandwidth and processing power, thereby allowing media programs to be prepared for streaming much faster than possible with conventional techniques. As such, dynamically-generated media programs can be made available to users on demand. The techniques described thus far are described in greater detail below in conjunction with FIG. 4.

Procedure for Generating and Streaming a Media Program

Figure 4:
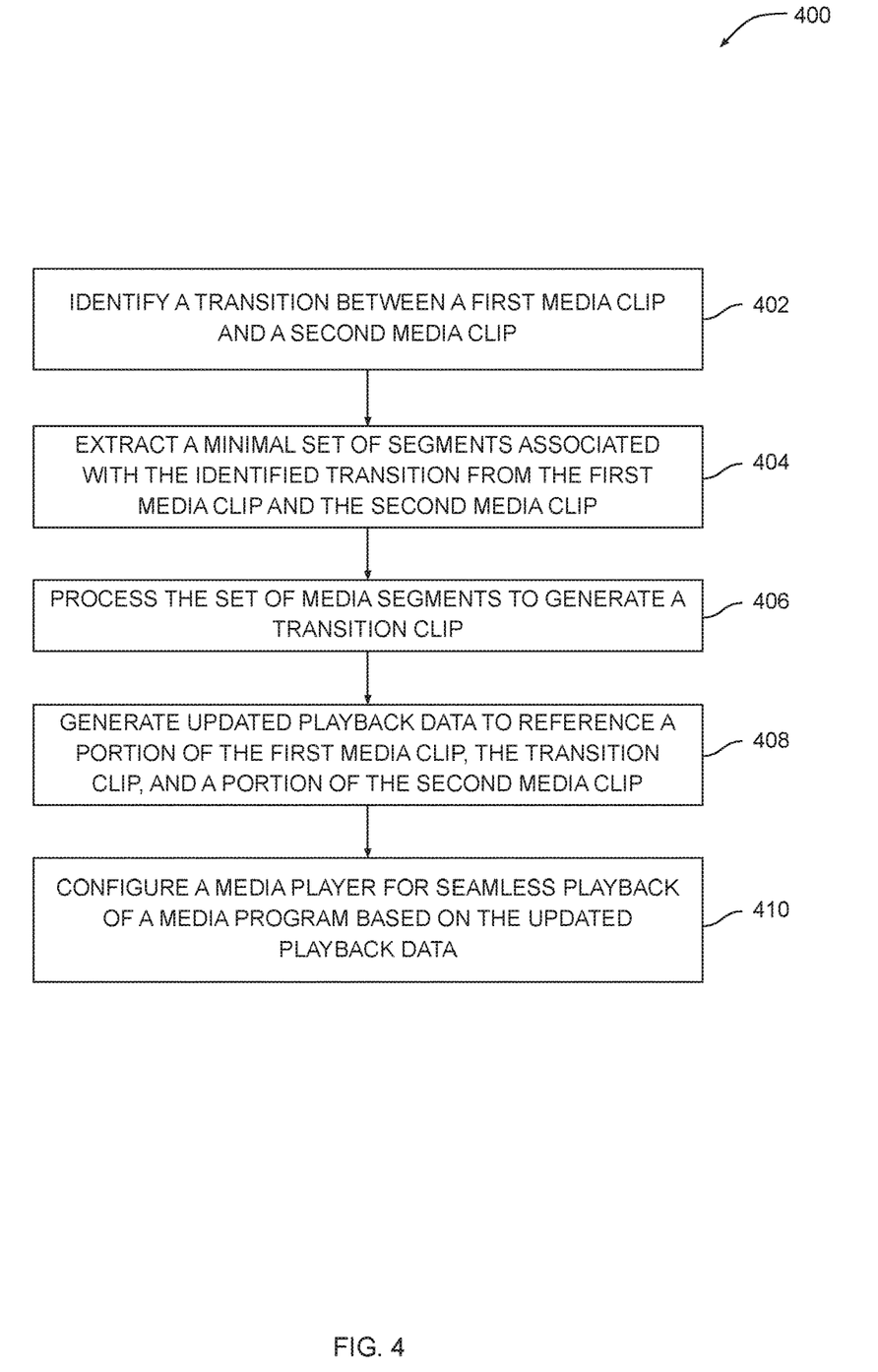
FIG. 4 is a flow diagram of method steps for generating and streaming a media program, according to various embodiments.

FIG. 4 is a flow diagram of method steps for generating and streaming a media program, according to various embodiments. Although the method steps are described in conjunction with the systems of FIGS. 1-3, persons skilled in the art will understand that any system configured to perform the method steps in any order falls within the scope of the present embodiments.

As shown, a method 400 begins at step 402, where transition analyzer 200 within media processing engine 132 identifies a transition between a first media clip and a second media clip. Media processing engine 132 can analyze initial playback data 128 in order to identify the transition. Initial playback data 128 is a media playlist that defines the order in which the first and second media clips should be played when media program 148 is streamed via client device 110. Initial playback data 128 indicates the start time, duration, and/or end time for each media clip. In one embodiment, initial playback data 128 may be an .m3.u8 file. Transition analyzer 200 identifies a transition between any two media clips when initial playback data 128 indicates that those two media clips should be played sequentially. In one embodiment, instead of identifying the transition based on initial playback data 128, transition analyzer 200 alternatively may analyze a "recipe" in order to identify the transition. The recipe sets forth specific intervals during which content is played, including the start times, end times, and duration of that content. An example of a recipe is described in the related non-provisional patent application titled, "Automated Media Production Pipeline for Generating Personalized Media Content," filed on Nov. 13, 2019 and having Ser. No. 16/683,178. The subject matter of this related patent application is hereby incorporated by reference in its entirety.

At step 404, transition analyzer 200 extracts a minimal set of media segments 144 from the first media clip and the second media clip that precede or follow the transition identified at step 402. For example, transition analyzer 200 could extract a .TS file from the end of the first media clip that includes video data to be played just before the transition identified at step 402. Similarly, transition analyzer 200 could extract a .TS file from the beginning of the second media clip that includes video data to be played just after the transition identified at step 402. Transition analyzer 200 can extract any duration of segment or any number of segments from one media clip or both media clips. In one embodiment, transition analyzer 200 may extract at least one segment from at least one of the first media clip or the second media clip.

At step 406, media transcoder 210 processes the set of media segments extracted at step 404 to generate transition clip 146. In so doing, media transcoder 210 performs one or more editing, blending, or compositing operations with the set of media segments extracted at step 404. Media transcoder 210 also can incorporate visual and/or audio effects into transition clip 146, including text, graphics, logos, 2D and 3D objects, and other forms of media content. In one embodiment, media transcoder 210 may perform different processing operations to generate different transition clips for different users.

At step 408, playback data generator 220 updates initial playback data 128 to reference a portion of the first media clip, the transition clip, and a portion of the second media clip, thereby generating updated playback data 130. Initial playback data 128 needs to be updated to accommodate playback of transition clip 146. For example, playback data generator 220 could update initial playback data 128 to indicate that playback of the first media clip 142 should stop one second earlier and playback of the second media clip 142 should start one second later to create an interval where transition clip 146 can be played.

At step 410, media processing engine 132 configures media player 118 for seamless playback of media program 148 based on updated playback data 130 generated at step 408. Media player 118 can stream media program 148 to client device 110 by accessing the various media clips indicated in updated playback data 130, including the portion of the first media clip, the transition clip, and the portion of the second media clip.

In sum, a media processing engine selectively transcodes only a portion of the media clips to be included in a personalized media program and then generates playback data that allows seamless playback of the personalized media program. The media processing engine analyzes initial playback data associated with the media program. The initial playback data indicates the media clips needed to generate the personalized media program. The media processing engine identifies one or more transitions between media clips in the personalized media program and determines specific segments of those media clips that are associated with the identified transition(s). The media processing engine performs transcoding operations with the determined segments of the media clips to generate one or more transition clips. The media processing engine then updates the initial playback data to indicate that the transition clip(s) should be played during the corresponding transition(s) between media clips and that shortened versions of the media clips should be played to accommodate the added transition segments. In this manner, the media processing engine can provide a seamless viewing experience of the personalized media program with limited expenditure of bandwidth and processing power.

At least one advantage of the disclosed techniques relative to the prior art is that the disclosed techniques enable personalized media programs to be dynamically generated without consuming large amounts of bandwidth or processing power. Accordingly, the disclosed techniques can be scaled to generate personalized media programs for numerous users simultaneously. Another advantage of the disclosed techniques is that the personalized media programs can be generated quickly, thereby providing users with faster access to personalized media programs. Yet another advantage is that additional transitional content can be dynamically inserted into media programs, thereby facilitating smoother transitions between media clips. These technological advantages represent one or more technological advancements over prior art approaches.

1. Some embodiments include a non-transitory computer-readable medium storing program instructions that, when executed by a processor, cause the processor to generate a media program for playback by performing the steps of determining a first transition between a first media clip and a second media clip based on initial playback data that indicates that a first media program should include one or more portions of the first media clip and one or more portions of the second media clip, processing at least a first portion of the first media clip and a first portion of the second media clip to generate a first transition clip, and causing a media player to playback the first media program, wherein the first media program includes a second portion of the first media clip, the first transition clip, and a second portion of the second media clip, and wherein, during playback of the first media program, the first transition clip is played back immediately subsequent to when playback of the second portion of the first media clip completes, and the second portion of the second media clip is played back immediately subsequent to when playback of the first transition clip completes.

2. The non-transitory computer-readable medium of clause 1, wherein the step of determining the first transition between the first media clip and the second media clip comprises determining that the initial playback data indicates that the first media clip should be played immediately prior to the second media clip.

3. The non-transitory computer-readable medium of any of clauses 1-2, wherein the step of processing the first portion of the first media clip and the first portion of the second media clip comprises encoding the first portion of the first media clip and encoding the first portion of the second media clip.

4. The non-transitory computer-readable medium of any of clauses 1-3, wherein the step of processing the first portion of the first media clip and the first portion of the second media clip comprises compositing the first portion of the first media clip and the first portion of the second media clip with at least one visual effect.

5. The non-transitory computer-readable medium of any of clauses 1-4, wherein the step of causing the media player to playback the first media program comprises generating updated playback data based on the initial playback data, and transmitting the updated playback data to the media player, wherein the media player streams the first media program from a content server based on the updated playback data.

6. The non-transitory computer-readable medium of any of clauses 1-5, wherein the updated playback data indicates a first playback interval corresponding to the second portion of the first media clip and a second playback interval corresponding to the second portion of the second media clip.

7. The non-transitory computer-readable medium of any of clauses 1-6, further comprising the steps of removing the first portion of the first media clip from the first media clip to generate the second portion of the first media clip, and removing the first portion of the second media clip from the second media clip to generate the second portion of the second media clip.

8. The non-transitory computer-readable medium of any of clauses 1-7, further comprising the step of selecting the first media clip and the second media clip for inclusion in the first media program based on first user data that indicates a set of viewing preferences associated with a first user.

9. The non-transitory computer-readable medium of any of clauses 1-8, wherein the first transition clip is generated based on the set of viewing preferences associated with the first user.

10. The non-transitory computer-readable medium of any of clauses 1-9, further comprising the steps of generating a second transition clip based on a set of viewing preferences associated with a second user, and generating an alternate version of the first media program that includes the second transition clip instead of the first transition clip.

11. Some embodiments include a computer-implemented method for generating a media program for playback, the method comprising determining a first transition between a first media clip and a second media clip based on initial playback data that indicates that a first media program should include one or more portions of the first media clip and one or more portions of the second media clip, processing at least a first portion of the first media clip and a first portion of the second media clip to generate a first transition clip, and causing a media player to playback the first media program, wherein the first media program includes a second portion of the first media clip, the first transition clip, and a second portion of the second media clip, and wherein, during playback of the first media program, the first transition clip is played back immediately subsequent to when playback of the second portion of the first media clip completes, and the second portion of the second media clip is played back immediately subsequent to when playback of the first transition clip completes.

12. The computer-implemented method of clause 11, wherein determining the first transition between the first media clip and the second media clip comprises determining that the initial playback data indicates that the first media clip should be played immediately prior to the second media clip.

13. The computer-implemented method of any of clauses 11-12, wherein processing the first portion of the first media clip and the first portion of the second media clip comprises compositing the first portion of the first media clip and the first portion of the second media clip with at least one visual effect.

14. The computer-implemented method of any of clauses 11-13, wherein causing the media player to playback the first media program comprises generating updated playback data based on the initial playback data, and transmitting the updated playback data to the media player, wherein the media player streams the first media program from a content server based on the updated playback data.

15. The computer-implemented method of any of clauses 11-14, wherein the updated playback data indicates a location associated with the first media clip, a location associated with the first transition clip, and a location associated with the second media clip.

16. The computer-implemented method of any of clauses 11-15, wherein the updated playback data indicates a first playback interval corresponding to the second portion of the first media clip and a second playback interval corresponding to the second portion of the second media clip.

17. The computer-implemented method of any of clauses 11-16, wherein a combined duration of the first portion of the first media clip and the first portion of the second media clip is equal to a duration of the transition clip.

18. The computer-implemented method of any of clauses 11-17, wherein the media player plays the first transition clip instead of playing the first portion of the first media clip and the first portion of the second media clip.

19. The computer-implemented method of any of clauses 11-18, further comprising removing the first portion of the first media clip from the first media clip to generate the second portion of the first media clip, and removing the first portion of the second media clip from the second media clip to generate the second portion of the second media clip.

20. Some embodiments include a system, comprising a memory storing a software application, and a processor that, when executing the software application, is configured to perform the steps of determining a first transition between a first media clip and a second media clip based on initial playback data that indicates that a first media program should include one or more portions of the first media clip and one or more portions of the second media clip, processing at least a first portion of the first media clip and a first portion of the second media clip to generate a first transition clip, and causing a media player to playback the first media program, wherein the first media program includes a second portion of the first media clip, the first transition clip, and a second portion of the second media clip, and wherein, during playback of the first media program, the first transition clip is played back immediately subsequent to when playback of the second portion of the first media clip completes, and the second portion of the second media clip is played back immediately subsequent to when playback of the first transition clip completes.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable medium storing program instructions that, when executed by a processor, cause the processor to generate a first media program for playback by performing the steps of:
   determining, based on user data associated with a first user, a media program recipe that specifies (i) a first interval to be populated with media content corresponding to a first media clip, (ii) a second interval to be populated with media content corresponding to a second media clip, (iii) the first media clip, and (iv) the second media clip, wherein the first interval specifies a first time associated with when playback of the first media clip ends and the second interval specifies a second time associated with when playback of the second media clip begins;
   determining a first transition between the first media clip and the second media clip based on the media program recipe;

determining transition content associated with the first transition based on the user data;

generating the first media program by:

performing one or more transcoding operations and one or more compositing operations specified in at least one of the first interval or the second interval to combine the transition content with a first portion of the first media clip and a first portion of the second media clip into a first transition clip;

modifying, based on a duration of the first transition clip, the first time associated with when playback of the first media clip ends to create a first playback interval for a first shortened version of the first media clip;

modifying, based on the duration of the first transition clip, the second time associated with when playback of the second media clip begins to create a second playback interval for a second shortened version of the second media clip; and generating updated playback data that specifies playback of the first transition clip during an interval that occurs between the first playback interval for the first shortened version of the first media clip and the second playback interval for the second shortened version of the second media clip; and after the first media grogram is generated, causing a media player to playback the first media program based on the updated playback data, wherein the first media program includes a second portion of the first media clip that corresponds to the first shortened version of the first media clip, the first transition clip, and a second portion of the second media clip that corresponds to the second shortened version of the second media clip, and wherein, during playback of the first media program, the first transition clip is played back immediately subsequent to when playback of the second portion of the first media clip completes, and the second portion of the second media clip is played back immediately subsequent to when playback of the first transition clip completes.

2. The non-transitory computer-readable medium of claim 1, wherein the step of determining the first transition between the first media clip and the second media clip comprises determining that the first interval and the second interval indicate that the first media clip should be played immediately prior to the second media clip.

3. The non-transitory computer-readable medium of claim 1, wherein the step of performing the one or more transcoding operations comprises encoding the first portion of the first media clip and encoding the first portion of the second media clip.

4. The non-transitory computer-readable medium of claim 1, wherein the transition content comprises at least one of text, a graphic, a logo, a branding asset, or a user interface element.

5. The non-transitory computer-readable medium of claim 1, wherein the step of causing the media player to playback the first media program comprises transmitting the updated playback data to the media player, wherein the media player streams the first media program from a content server based on the updated playback data.

6. The non-transitory computer-readable medium of claim 1, wherein the modified first time associated with the first playback interval is earlier than the first time specified in the first interval and the modified second time associated with the second playback interval is later than the second time specified in the second interval.

7. The non-transitory computer-readable medium of claim 1, further comprising the steps of:

removing the first portion of the first media clip from the first media clip to generate the second portion of the first media clip; and removing the first portion of the second media clip from the second media clip to generate the second portion of the second media clip.

8. The non-transitory computer-readable medium of claim 1, wherein determining the transition content comprises determining at least one of a length, a color scheme, or a style associated with the transition content.

9. The non-transitory computer-readable medium of claim 1, further comprising the steps of:

generating a second transition clip based on a set of viewing preferences associated with a second user; and generating an alternate version of the first media program that includes the second transition clip instead of the first transition clip.

10. A computer-implemented method for generating a first media program for playback, the method comprising:

determining, based on user data associated with a first user, a media program recipe that specifies (i) a first interval to be populated with media content corresponding to a first media clip, (ii) a second interval to be populated with media content corresponding to a second media clip, (iii) the first media clip, and (iv) the second media clip, wherein the first interval specifies a first time associated with when playback of the first media clip ends and the second interval specifies a second time associated with when playback of the second media clip begins;

determining a first transition between the first media clip and the second media clip based on the media program recipe;

determining transition content associated with the first transition based on the user data;

generating the first media program by:

performing one or more transcoding operations and one or more compositing operations specified in at least one of the first interval or the second interval to combine the transition content with a first portion of the first media clip and a first portion of the second media clip into a first transition clip;

modifying, based on a duration of the first transition clip, the first time associated with when playback of the first media clip ends to create a first playback interval for a first shortened version of the first media clip;

modifying, based on the duration of the first transition clip, the second time associated with when playback of the second media clip begins to create a second playback interval for a second shortened version of the second media clip; and generating updated playback data that specifies playback of the first transition clip during an interval that occurs between the first playback interval for the first shortened version of the first media clip and the second playback interval for the second shortened version of the second media clip; and after the first media program is generated, causing a media player to playback the first media program based on the updated playback data, wherein the first media program includes a second portion of the first media clip that corresponds to the first shortened version of the first media clip, the first transition clip, and a second portion of the second media clip that corresponds to the second shortened version of the second media clip, and wherein, during playback of the first media program, the first transition clip is played back immediately subsequent to when playback of the second portion of the first media clip completes, and the second portion of the second media clip is played back immediately subsequent to when playback of the first transition clip completes.

11. The computer-implemented method of claim 10, wherein determining the first transition between the first media clip and the second media clip comprises determining that the first interval and the second interval indicate that the first media clip should be played immediately prior to the second media clip.

12. The computer-implemented method of claim 10, further comprising:
determining second transition content associated with the first transition based on user data associated with a second user;
combining the second transition content with a third portion of the first media clip and a third portion of the second media clip into a second transition clip; and
generating a second media program that includes a fourth portion of the first media clip, the second transition clip, and a fourth portion of the second media clip.

13. The computer-implemented method of claim 10, wherein causing the media player to playback the first media program comprises transmitting the updated playback data to the media player, wherein the media player streams the first media program from a content server based on the updated playback data.

14. The computer-implemented method of claim 10, wherein the updated playback data indicates a location associated with the first media clip, a location associated with the first transition clip, and a location associated with the second media clip.

15. The computer-implemented method of claim 10, wherein the modified first time associated with the first playback interval is earlier than the first time specified in the first interval and the modified second time associated with the second playback interval is later than the second time specified in the second interval.

16. The computer-implemented method of claim 10, wherein a combined duration of the first portion of the first media clip and the first portion of the second media clip is equal to the duration of the first transition clip.

17. The computer-implemented method of claim 10, wherein the media player plays the first transition clip instead of playing the first portion of the first media clip and the first portion of the second media clip.

18. The computer-implemented method of claim 10, further comprising:
removing the first portion of the first media clip from the first media clip to generate the second portion of the first media clip; and
removing the first portion of the second media clip from the second media clip to generate the second portion of the second media clip.

19. A system, comprising:
a memory storing a software application; and
a processor that, when executing the software application, is configured to perform the steps of:
determining, based on user data associated with a first user, a media program recipe that specifies (i) a first interval to be populated with media content corresponding to a first media clip, (ii) a second interval to be populated with media content corresponding to a second media clip, (iii) the first media clip, and (iv) the second media clip, wherein the first interval specifies a first time associated with when playback of the first media clip ends and the second interval specifies a second time associated with when playback of the second media clip begins;
determining a first transition between the first media clip and the second media clip based on the media program recipe;
determining transition content associated with the first transition based on the user data;
generating a first media program by:
performing one or more transcoding operations and one or more compositing operations specified in at least one of the first interval or the second interval to combine the transition content with a first portion of the first media clip and a first portion of the second media clip into a first transition clip;
modifying, based on a duration of the first transition clip, the first time associated with when playback of the first media clip ends to create a first playback interval for a first shortened version of the first media clip;
modifying, based on the duration of the first transition clip, the second time associated with when playback of the second media clip begins to create a second playback interval for a second shortened version of the second media clip; and
generating updated playback data that specifies playback of the first transition clip during an interval that occurs between the first playback interval for the first shortened version of the first media clip and the second playback interval for the second shortened version of the second media clip; and
after the first media program is generated, causing a media player to playback the first media program based on the updated playback data, wherein the first media program includes a second portion of the first media clip that corresponds to the first shortened version of the first media clip, the first transition clip, and a second portion of the second media clip that corresponds to the second shortened version of the second media clip, and wherein, during playback of the first media program, the first transition clip is played back immediately subsequent to when playback of the second portion of the first media clip completes, and the second portion of the second media clip is played back immediately subsequent to when playback of the first transition clip completes.

* * * * *

UNITED STATES PATENT AND TRADEMARK OFFICE
CERTIFICATE OF CORRECTION

| | | |
|---|---|---|
| PATENT NO. | : 11,997,329 B2 | Page 1 of 1 |
| APPLICATION NO. | : 16/683176 | |
| DATED | : May 28, 2024 | |
| INVENTOR(S) | : Katharine S. Navarre et al. | |

It is certified that error appears in the above-identified patent and that said Letters Patent is hereby corrected as shown below:

In the Claims

In Column 13, Line 26, in Claim 1, delete "grogram" and insert -- program --.

Signed and Sealed this
Nineteenth Day of November, 2024

Katherine Kelly Vidal
*Director of the United States Patent and Trademark Office*